G. O. CURME, Jr.
PROCESS OF SEPARATING ETHYLENE AND OTHER COMPONENTS FROM GASEOUS MIXTURES CONTAINING THE SAME.
APPLICATION FILED APR. 20, 1917. RENEWED DEC. 1, 1920.
1,422,184.
Patented July 11, 1922.
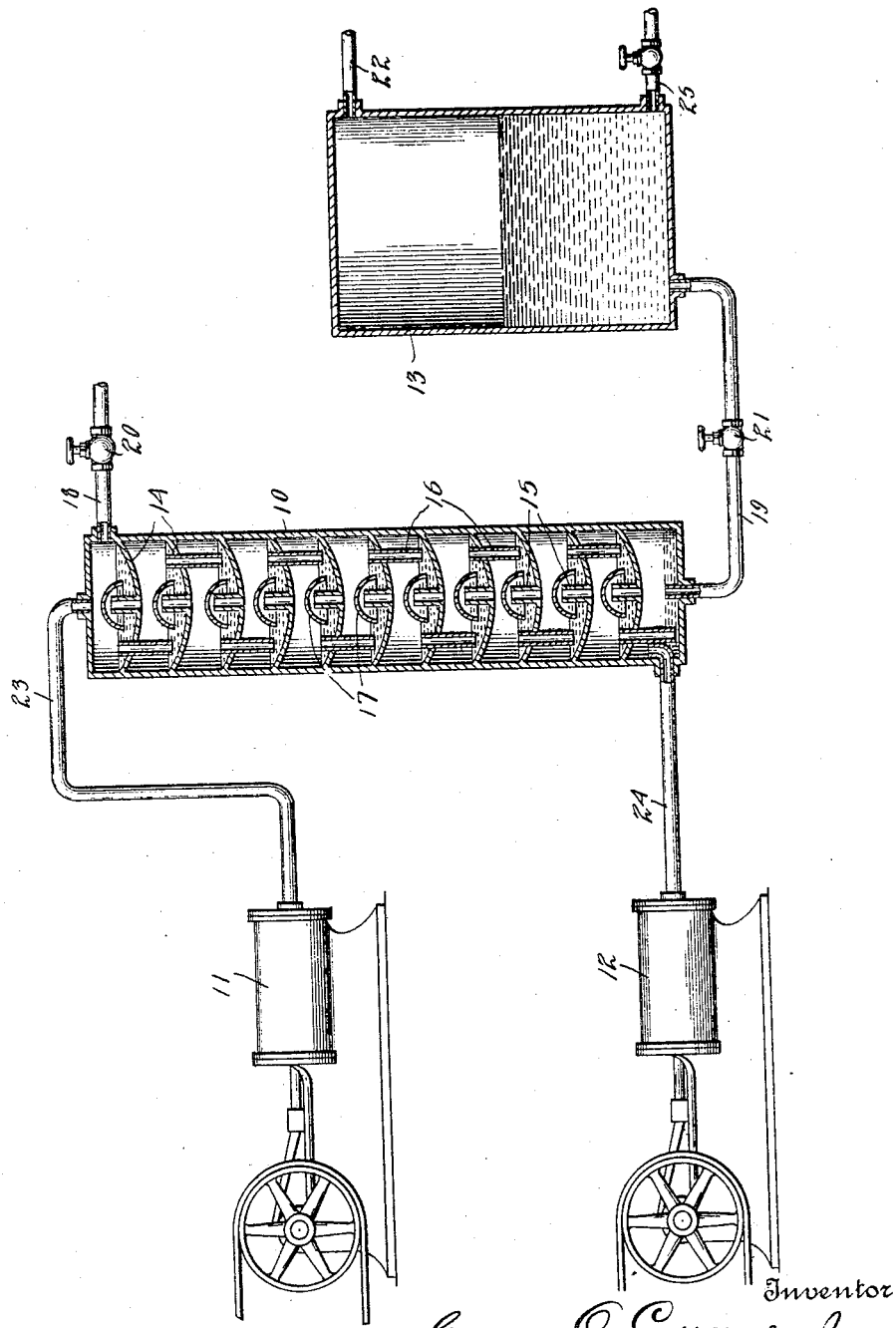

UNITED STATES PATENT OFFICE.

GEORGE OLIVER CURME, JR., OF PITTSBURGH, PENNSYLVANIA, ASSIGNOR, BY MESNE ASSIGNMENTS, TO UNION CARBIDE COMPANY, OF NEW YORK, N. Y., A CORPORATION OF VIRGINIA.

PROCESS OF SEPARATING ETHYLENE AND OTHER COMPONENTS FROM GASEOUS MIXTURES CONTAINING THE SAME.

1,422,184. Specification of Letters Patent. Patented July 11, 1922.

Application filed April 20, 1917, Serial No. 163,523. Renewed December 1, 1920. Serial No. 427,659.

*To all whom it may concern:*

Be it known that I, GEORGE O. CURME, Jr., a citizen of the United States, residing at Pittsburgh, Allegheny County, and State of Pennsylvania, have invented and discovered certain new and useful Improvements in Processes of Separating Ethlyene and Other Components from Gaseous Mixtures Containing the Same, of which the following is a specification.

The solubility of ethylene in acetone, acetaldehyde, and certain other organic solvents is a fact long recognized by those familiar with its behavior. In this respect, it acts very differently from other ordinary gases, in that it possesses a solubility many times as great as that of most ordinary gases. Moreover, as is universally accepted, the solubility of a gas in a liquid is directly proportional to the pressure exerted by said gas over said liquid.

By a combination and utilization of the two above mentioned principles, I have perfected a process for the successful separation, on a large scale, of ethlyene from gaseous mixtures containing the same. The gaseous mixture containing ethylene should first be compressed by suitable means to a pressure such that the partial pressure of the ethylene in the compressed gas itself amounts to several atmospheres; the higher this pressure is, the greater is the efficiency of the process. The gas thus compressed is then to be passed through a suitable absorption vessel through which a counter-current of acetone, or other suitable organic solvent, is being forced, and, indeed, in such a manner that the gas is brought into intimate contact with the acetone. This arrangement acts in such a way that the gases leaving this absorption vessel are washed by fresh incoming solvent, and the solvent leaving the absorption vessel is brought in contact with gases richest in ethylene—this is a well known principle in the washing of gases.

The accompanying drawing illustrates an apparatus for the practice of my process in which 10 represents an absorption tower, 11 an acetone pressure pump, 12 a gas compressor, and 13 an expander or expansion chamber.

The absorption tower contains a series of horizontal partitions 14, either flat, or cup-shaped as shown, each of which has a central aperture surrounded by a tube 15, which extends to a point a short distance above the top of another tube 16, which passes through an aperture near one side to each horizontal partition. Said tubes 16 are arranged in adjacent partitions on opposite sides of the tower, as shown. A cup-shaped baffle plate 17 is mounted above each central tube 15 with its lower edges extending to a level below the top of each tube 16. A gas escape pipe 18 is connected with the upper end of the tower and an acetone escape pipe 19 with its lower end. Said gas escape pipe 18 is provided with a high pressure blow-off valve 20 and said acetone escape pipe 19 is provided with a high pressure acetone escape valve 21. The expanding chamber or vessel is provided with an escape pipe 22 at its upper end for the escape of the purified ethylene, which is conducted by said pipe to the gas holder, not shown.

In operation the acetone is pumped into the top of the tower by pump 11 through a pipe 23, and the gas is pumped into the bottom of the tower through a pipe 24. In general, the operation will be readily understood from the description and an inspection of the drawing. The acetone passing into the expander 13 collects in the bottom thereof, is separated from the last amounts of gaseous ethylene, and may be drawn off through pipe 25 to be used again, or further purified from dissolved ethylene, as will be described.

The valves 20 and 21 are automatic pressure valves adapted to be operated at a predetermined pressure, as is well understood.

After leaving the absorption tower, the gases free from ethylene escape through the pipe 18 and are used or disposed of as desired. After leaving the absorption tower, the solvent, which now contains all the ethylene of the incoming crude gas mixture, is allowed to pass the release valve 21 and expand into vessel 13, and in so doing, loses most of the ethylene which it had contained, for, as above stated, the solubility is proportional to the pressure, and once the pressure is released the excess of ethylene is evolved in the gaeous state. This gas, which is now nearly pure ethylene, can be led off through pipe 22, and used as such, or purified further to give a gas of highest purity.

The acetone, after the liberation of the gas, still contains certain amounts of ethylene in solution, which can be entirely removed by subjecting it to distillation in an ordinary still. After a small portion has distilled over, the remainder is quite free from ethylene and ready for use as before. This ethylene-free portion is used over again for the purification of the crude gas mixture. The small portion which was distilled over with the escaping ethylene is condensed and added to a further portion saturated with ethylene, so that eventually it, too, is purified and used over again. The ethylene thus liberated by the distillation is added to the first portion and is used as described above.

In case the gaseous mixture containing the ethylene contains also other gases possessing an equal or greater solubility in acetone, such as propylene or acetylene, these latter gases may be removed beforehand by some other treatment, and the partially purified mixture then may be deprived of its ethylene as above described; or else, all of the soluble gases may be removed together, as above described, and the mixture of these soluble gases may be utilized or subjected to further purification.

This process then starts with a gaseous mixture containing ethylene along with other less valuable gases, removes the more valuable ethylene by a single, or, in certain cases, a repeated simple process, consisting of compression, solution in a suitable solvent, and subsequent expansion to free the pure ethylene.

Thus, nothing is lost in the process, the solvent and the two fractions of the gaseous mixture may both be utilized for any desired purpose, and the value of the one fraction, namely the ethylene, has been greatly increased, and put into a marketable condition. The process can be continued and the acetone be used over and over again.

Having thus fully described my said invention, what I claim as new and desire to secure by Letters Patent, is:

1. The process of separating ethylene from gaseous mixtures containing the same which consists in compressing the mixture, passing the gases thus compressed through a suitable solvent flowing counter to the gas stream, drawing off the gases free from the ethylene, then removing the pressure from the solvent containing the ethylene, and leading off the purified ethylene.

2. The process of separating ethylene along with other gases soluble in acetone from a gaseous mixture containing the same which consists in compressing the mixture, passing the compressed gases through an absorption vessel through which a counter-current of acetone is being forced, removing the undissolved gases, and removing the pressure from the solvent, containing ethylene, and other soluble gases and leading off the ethylene and other soluble gases.

3. The process of separating ethylene from gaseous mixtures containing the same which consists in compressing the mixture, passing the gases thus compressed through a solvent flowing counter to the gas stream, drawing off the gases free from the ethylene, removing the pressure from the solvent containing the ethylene, leading off the purified ethylene, and returning the solvent for further use.

4. The process of separating ethylene from gaseous mixtures containing the same which consists in compressing the mixture, passing the gases thus compressed through a solvent supplied continuously, removing the undissolved gases, removing the pressure from the solvent containing the ethylene, and leading off the ethylene.

5. The process of separating ethylene from gaseous mixtures containing the same which consists in compressing the mixture, passing the gases thus compressed through a solvent, removing the undissolved gases, removing the pressure from the solvent containing the ethylene until all of the ethylene contained in said solvent is recovered, and leading off said ethylene.

6. The process of separating ethylene from gaseous mixtures containing the same, which consists in compressing the mixture, passing the gases thus compressed through a solvent for ethylene, removing the undissolved gases, subjecting the solvent to decreased pressure and drawing off the ethylene thus liberated.

In witness whereof, I have hereunto set my hand and seal at Pittsburgh, Pennsylvania, this 18th day of April, A. D. nineteen hundred and seventeen.

GEORGE OLIVER CURME, Jr.

Witnesses:
H. BUNSEN HEYN,
GLEN DAVID BAGLEY.